6/9/83 OR 4,398,088

United States Patent [19]

Hirose et al.

[11] 4,398,088

[45] Aug. 9, 1983

[54] AUTOMATIC BANK NOTE TRANSACTION APPARATUS

[75] Inventors: Minoru Hirose, Yokohama; Junichiro Hara, Tokyo; Hiroyuki Kubotera, Matsuda, all of Japan

[73] Assignee: Tokyo Shibaura Denki Kabushiki Kaisha, Kawasaki, Japan

[21] Appl. No.: 332,299

[22] Filed: Dec. 18, 1981

[30] Foreign Application Priority Data

Dec. 24, 1980 [JP] Japan ................................ 55-183650

[51] Int. Cl.³ ................................................ G06F 15/30

[52] U.S. Cl. ...................................... 235/379; 209/534

[58] Field of Search ......................... 235/379; 209/534; 194/DIG. 14; 382/7

[56] References Cited

U.S. PATENT DOCUMENTS 3,800,155 3/1974 Potenza .............................. 209/534

*Primary Examiner*—Harold I. Pitts

*Attorney, Agent, or Firm*—Cushman, Darby & Cushman

[57] ABSTRACT

In an automatic bank note transaction apparatus, bank notes inserted therein through a bank note inlet slot are transferred from a receiving chamber to an introduction-transfer path, fit sheets are discriminated from unfit ones among the bank notes by a discriminator during the transfer, and then the fit and unfit sheets are allotted or distributed by gates so that the unfit sheets are collected in a temporary unfit sheet collecting section and that the fit sheets are collected in temporary fit sheet collecting sections provided for several kinds of bank notes. One and the other ends of a return path for the bank notes are connected with the temporary unfit sheet collecting section and the receiving chamber, respectively, so that the unfit sheets may be once returned to the receiving chamber and then introduced therefrom again into the introduction-transfer path. The temporary fit sheet collecting sections are selectively connected with the return path so that the fit sheets in these collecting sections may also be returned to the receiving chamber at a customer's request.

7 Claims, 4 Drawing Figures

AUTOMATIC BANK NOTE TRANSACTION APPARATUS

BACKGROUND OF THE INVENTION

This invention relates to automatic bank note transaction apparatus, such as automatic depositing machines, automatic drawing machines, etc.

The apparatus of these kinds have recently been developed and spread to achieve reduction of labor in service at the window in banks or other places.

In one such prior art apparatus, if bank notes inserted therein through a money inlet slot are judged to be false or unfit by a discriminating device included in the apparatus, they are returned as unfit sheets to a return outlet provided exclusively for unfit sheets. Also, if a customer or user pushes a disapproval button at amount check during the operation of the apparatus, all the bank notes put in the apparatus are returned to the same return outlet.

Since the exclusive-use return outlet for unfit sheets, however, is disposed separately from the money inlet slot, the user who intends to put the bank notes again into the apparatus for reprocessing for depositing need take out the bank notes from the return outlet and insert them again into the money inlet slot. This operation constitutes a hindrance to the speediness and simplicity of operation which is required of the apparatus of this kind. Even in the case where the unfits sheets are to be taken out and the bank notes are not to be put into the apparatus for repeated operation any more, the separate arrangement of the unfit sheet return outlet and the money inlet slot would give the user trouble in operation and result in waste of time.

In the prior art apparatus, moreover, the bank notes once returned to the return outlet cannot be handled again for depositing unless the user takes the trouble to remove them from the return outlet and to put them again into the money inlet slot. This also constitutes an obstacle to the speediness and simplicity of operation expected of the apparatus of such a type.

SUMMARY OF THE INVENTION

Accordingly, the object of this invention is to provide an automatic bank note transaction apparatus simplified in structure for improved compactness and capable of speedier and simpler user operation.

To this end, an apparatus according to this invention is basically so constructed that a money inlet slot doubles as a return outlet for unfit sheets, and that unfit sheets returned to a receiving chamber corresponding to the money inlet slot may be introduced from the receiving chamber again into the apparatus for reprocessing for depositing without troubling the user. To attain this, one and the other ends of a return path for the unfit sheets are connected with the money inlet slot and a temporary collecting section for collecting the unfit sheets in the apparatus, respectively.

Thus, requiring no separate return outlet for unfit sheets, the apparatus of this invention facilitates user operation. Since the unfit sheets are automatically introduced again into the apparatus for depositing after they are once returned to the receiving chamber at the money inlet, so repeated processing for depositing may quickly be performed without troubling the user to take out the unfit sheets. Moreover, it is necessary only that only the unfit sheets finally regarded as rejectable after the repeated processing be taken out from the money inlet slot.

In the apparatus of this invention, furthermore, the bank notes returned to the receiving chamber at the money inlet are turned upside down and inside out as compared with the initial state as they are introduced again from the receiving chamber for reprocessing for depositing. The reversed position of the bank notes at the reprocessing leads to the following advantage. In general, the checking range of a sheet discriminator used in an apparatus of this kind is limited to one side of a bank note or some other sheet. In the apparatus of this invention, however, the opposite side of the bank note may also be checked at the reprocessing operation, and thus the checking range is widened. This may increase the chance that a bank note which is once rejected as an unfit sheet for some reason should be judged to be fit in the second cycle of discrimination, thus contributing to the improvement of the processing capability of the apparatus. On the other hand, the upside down location of the bank note at the reprocessing produces satisfactory results in the following case. Let us suppose, for example, a bank note which was rejected as an unfit sheet because it had accidentally been dog-eared at one end portion at the initial cycle of discrimination. If such a bank note is transferred upside down for the second cycle of discrimination, then the dog-eared portion will possibly be restored to ensure correct discrimination.

In a preferred embodiment of the apparatus of this invention, a plurality of temporary collecting sections for fit sheet are provided according to the kind of sheet. Fit sheets collected in the several collecting sections are finally collected all at once in their corresponding storage sections of e.g. a cashbox when the user pushes an approval button or key on a control board of the apparatus. These temporary fit sheet collecting sections are so constructed as to be selectively connected with a return path for unfit sheet. If the user pushes a disapproval button or key on the control board, all the temporary fit sheet collecting sections are connected simultaneously with the return path, and all the fit sheets, along with unfit sheets, are returned to the receiving chamber at the money inlet. Thus, the user can withdraw all the returned bank notes from the money inlet slot.

The bank note transfer system in the apparatus may considerably be simplified due to the arrangement of the plurality of temporary fit sheet collecting sections in line with the temporary unfit sheet collecting section, and to the design of the money inlet slot doubling as a return outlet. Accordingly, the processing speed of the apparatus may be increased and the design of the aparaus as a whole may be improved in compactness.

DETAILED DESCRIPTION OF THE PREFERRED EMBODIMENT

Figure 1:
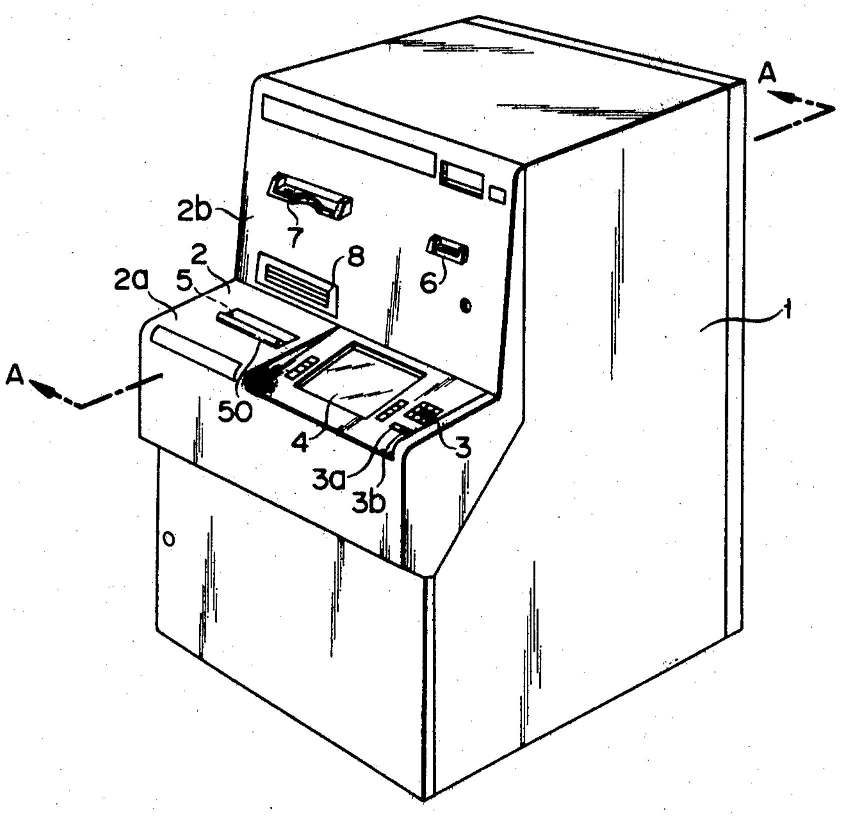
FIG. 1 is a general perspective view of an automatic bank note transaction apparatus of this invention.

Referring now to the general perspective view of FIG. 1, there is shown an automatic bank note transaction apparatus of this invention which is provided with a housing 1 and a control panel 2 disposed on the front side of the housing 1 to face a customer or user. The control panel 2 is composed of a substantially horizontal control board 2*a* and a vertical control board 2*b* rising from the rear edge of the board 2*a*. The horizontal control board 2*a* bears a keyboard 3, a CRT display unit 4, a money inlet slot 5, an approval key 3*a*, and a disapproval key 3*b*. On the vertical control board 2*b* are arranged a card inlet slot 6, a passbook inlet slot 7, and a money outlet slot 8.

In the housing 1, there are disposed a card reading mechanism connected with the card inlet slot 6 to read information on an ID card inserted through the slot 6, and a passbook reading/printing mechanism connected with the passbook inlet slot 7 to read a magnetic stripe on a passbook inserted through the slot 7 and record transaction information stored in the stripe. These mechanisms, which may be conventional ones and do not constitute any features or advantages of the invention, are not shown, nor is a payment mechanism which, disposed also in the housing 1, delivers bank notes P equivalent to a designated amount to the money outlet slot 8.

Figure 2:
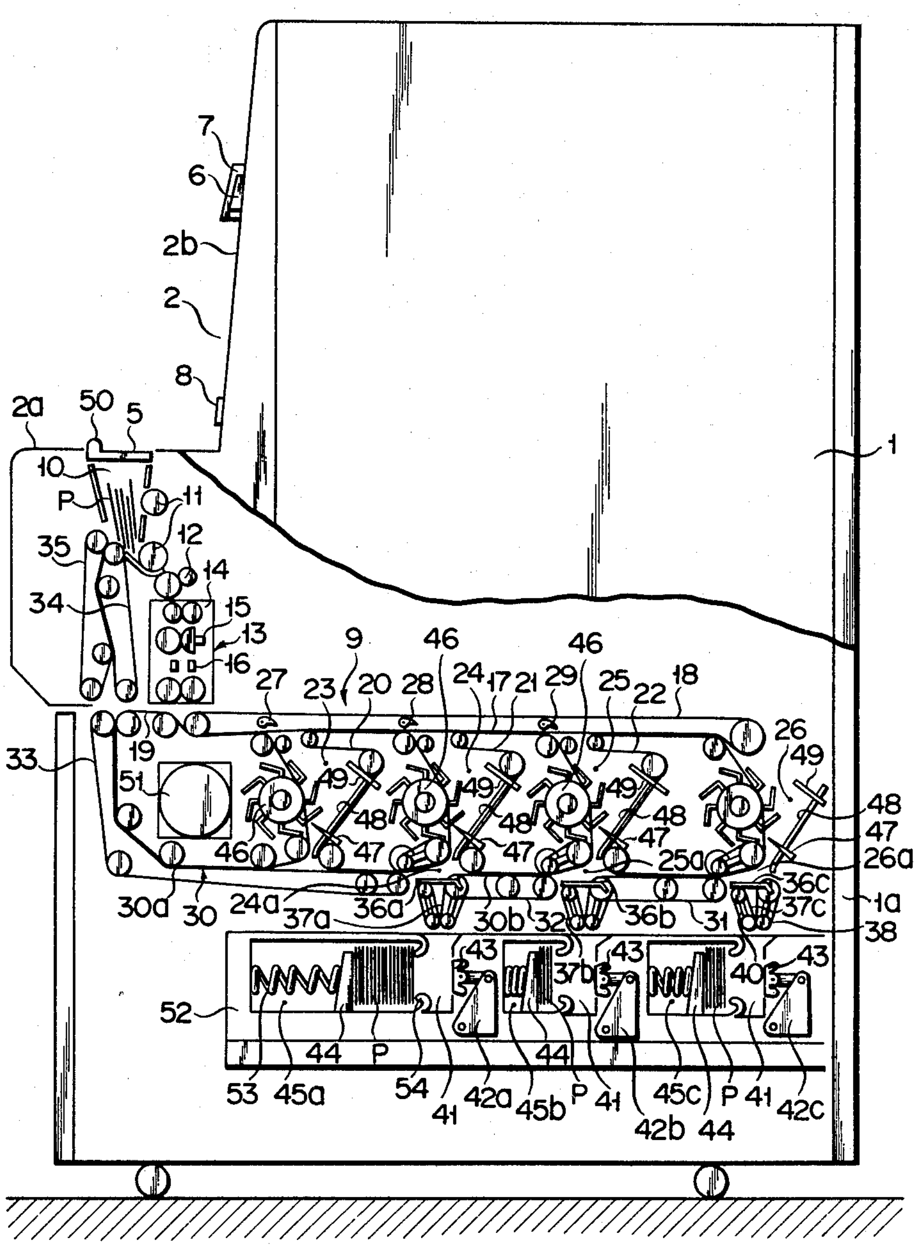
FIG. 2 is a partially broken, enlarged profile of the apparatus as taken along line A—A of FIG. 1.

FIG. 2 shows a depositing mechanism 9 for depositing bank notes P put in the apparatus through the money inlet slot 5.

The depositing mechanism 9 has a bank note receiving chamber 10 which is defined right under the money inlet slot 5 inside the housing 1 so as to correspond to the slot 5. As may be seen from FIG. 2, the bottom of the receiving chamber 10 is declined toward the right, and a pair of introduction rollers 11 are disposed at the inclined lower end portion of the chamber 10. The bank notes P are put into the receiving chamber 10 in a substantially vertical posture as shown. The bank notes P received in the receiving chamber 10 naturally move along the inclined bottom surface of the chamber 10 to the right as they are kept in the vertical posture, and reach a position where they can be introduced by the introduction rollers 11.

The bank notes P in the receiving chamber 10 are introduced one by one by the pair of introduction rollers 11, and are vertically led into a discriminator 13 by a pair of transfer rollers 12 in the next stage. The introduction rollers 11 and the transfer rollers 12 constitute part of introduction-transfer means for the bank notes P.

Including a thickness detecting section 14, a magnetism detecting section 15, and a bank note width/length detecting section 16, the discriminator 13 makes a decision on whether each bank note P passing therethrough is a proper or fit sheet or an unfit sheet to be rejected, as a synthetic judgment based on detection results from those individual detecting sections.

The discriminator 13 is located in an introduction-transfer path 17 with one end portion thereof beside the pair of introduction rollers 11. The transfer path 17 changes its course from a substantially vertical flow to a horizontal flow at the outlet of the discriminator 13. The bank note P passed through the discriminator 13 is transferred through the horizontal portion of the transfer path 17 deep into the housing 1. The horizontal portion of the transfer path 17 is defined by an elongated first endless belt 18, and second, third, fourth and fifth endless belts 19, 20, 21 and 22 that are arranged partially in contact with the bottom-side portion of the first endless belt 18. These endless belts constitute the remaining part of the introduction-transfer means.

The second belt 19 forms a substantially rectangular loop, while the third, fourth and fifth belts 20, 21 and 22 form loops of the shape as shown in FIG. 2. All these belts 19 to 22 extend horizontally across the depth of the housing 1.

A substantially triangular space section defined between the second and third belts 19 and 20 forms a temporary collecting section 23 for unfit sheet. Space section defined between the third and fourth belts 20 and 21, between the fourth and fifth belts 21 and 22, and between the fifth belt 22 and a rear wall 1*a* of the housing 1 form first, second and third temporary collecting sections 24, 25 and 26 for fit sheet, respectively. These temporary fit sheet collecting sections 24, 25 and 26 are provided according to the kinds of bank notes to be handled, e.g., the amount units. Namely, bank notes of an amount unit are collected in one and the same collecting section. All these temporary collecting sections 23 to 26 are arranged horizontally substantially at regular intervals across the depth of the housing 1.

First, second and third distributing gates 27, 28 and 29 consitituting distributing means are arranged at spaces in the horizontal portion of the introduction-transfer path 17. The first gate 27 selectively leads the bank notes P from the transfer path 17 into the temporary unfit sheet collecting section 23, the second gate 28 into the first temporary fit sheet collecting section 24, and the third gate 29 into the second temporary fit sheet collecting section 25. The discriminator 13 and those gates are electrically connected so that the gates may be operated in accordance with the result of decision by the discriminator 13.

A substantially L-shaped return transfer path or return path 30 extends from under the temporary collecting sections 23, 24, 25 and 26 to the frontage of the second belt 19, that is, to the left side of FIG. 2. The return path 30 is defined by belt sections between the fifth endless belt 22 and a sixth endless belt 31, between the fourth endless belt 21 and a seventh endless belt 32, between the third and second belts 20 and 19 and an L-shaped eighth endless belt 33, and between ninth and tenth endless belts 34 and 35. A main return path section 30*a* of the return path 30 is composed of a section defined by the eighth belt 33 and a section defined by the ninth and tenth belts 34 and 35. One and the other end portions of the main return path section 30*a* are connected with the temporary collecting section 23 and the receiving chamber 10, respectively. Additional return path sections 30*b* and 30*c* of the return path 30 correspond to the sections defined by the seventh and sixth belts 32 and 31, respectively. Further, shutter members 36*a*, 36*b* and 36*c* forming switching means capable of horizontal sliding movement are disposed in opening regions 24*a*, 25*a* and 26*a*, respectively, at the respective bottoms of the first, second and third temporary fit sheet collecting sections 24, 25 and 26 so as to be able to open those opening regions. The shutter member 36 is so located as to connect the one end of the main return path section 30*a* with one end of the additional return path section 30*b*, while the shutter member 36*b* is so located as to connect the other end of the additional return path section 30*b* with one end of the additional return path section 30*c*. The shutter member 36*c* is located at the other end portion of the additional return path section 30c.

Figure 3:
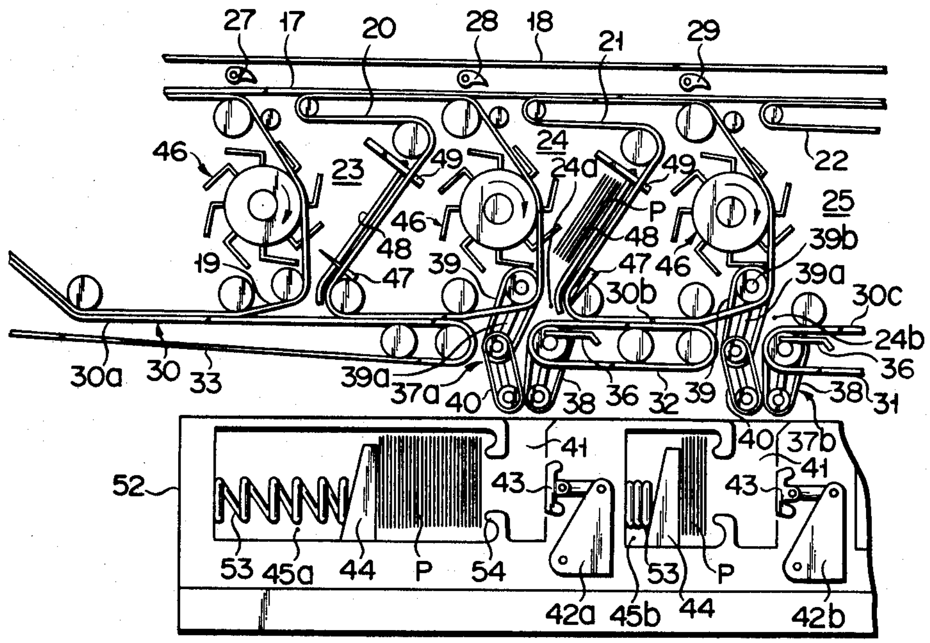
FIG. 3 is a partial enlarged view illustrating the operation of the mechanism shown in FIG. 2.

Beside the shutter members 36a, 36b and 36c are provided delivery mechanisms 37a, 37b and 37c, respectively, for delivering the bank notes P collected in their corresponding temporary collecting sections 24, 25 and 26 to a cashbox 52 underlying the return path 30. These delivery mechanisms are all of the same construction, and are each composed of an eleventh endless belt 38, a twelfth endless belt 39 located above the eleventh belt 38 so as diagonally to face the same, and a thirteenth endless belt 40 located on the same level with the eleventh belt 38 to form a V-shape therewith, as shown in FIG. 3. The eleventh and thirteenth belts 38 and 40 are so spring-biased as to push each other at their lower end portions. The twelfth belt 39 can rock, from the position shown in FIG. 2 to the position shown in FIG. 3, around a shaft 39b of the upper one of a pair of guide rollers supportng the belt 39, by means of an arm 39a connecting the two guide rollers. When the belts 39 are in the position of FIG. 2, the shutter members 36a, 36b and 36c slide forward to close their corresponding opening regions 24a, 24b and 24c. When the belts 39 are in the position of FIG. 3, on the other hand, the shutter members withdraw from their corresponding opening regions to open the same. In the latter position, the twelfth belts 39 constituting part of the switching means cut off the return path 30. As a result, the fit sheets P collected in the temporary fit sheet collecting sections 24, 25 and 26 are introduced into the opened opening regions 24a, 24b and 24c, and vertically dropped in bundles into their corresponding inlet openings 41 of the cashbox 52, guided by the eleventh, twelfth and thirteenth belts 38, 39 and 40.

Push mechanisms 42a, 42b and 42c of the same construction are disposed in the cashbox 52 correspondingly to the inlet openings 41. The push mechanisms 42a, 42b and 42c push the dropped bank notes P horizontally by means of their respective pushers, 43, thereby putting the bank notes P into their corresponding storage sections 45a, 45b and 45c so as to press them against their corresponding backup members 44. The backup members 44 are each biased by a spring 53. The bank notes P once stored in the storage sections 45a, 45b and 45c are prevented from running out of the storage sections by stop members 54 projected inward at the respective inlets of these sections.

The cashbox 52 has such a construction (not shown) that a bank clerk in charge may draw it out of the housing 1 from the back or flank thereof.

Now there will be described the arrangements of the temporary unfit sheet collecting section 23 and the first to third temporary fit sheet collecting sections 24 to 26. All these sections are also of the same construction, each including an impeller 46, a rockable support gate member 47 for temporarily supporting the lower edge portions of the bank notes P, a guide plate 48 receiving aslant the bank notes P supported by the member 47, and a depressing member 49 spaced from the gate member 47 and facing the upper edge portions of the bank notes P stacked on the guide plate 48. The depressing member 49 can slide downward along the surface of the guide plate 48 by means of a driving mechanism (not shown).

In FIGS. 2 and 3, the impellers 46 rotate in the clockwise direction to receive one by one, on their bent blades formed thereon, the bank notes P led from the transfer path 17 by their corresponding distributing gates 27, 28 and 29, and to drop the bank notes P on to their corresponding guide plates 48.

The impellers are of a well-known type as stated in DE-AS No. 1,079,078, for example.

As shown in FIG. 3, the gate member 47 for the unfit sheet collecting section 23 is located in a position (hereinafter referred to as holding position) where it holds the bank notes within the section 23. The gate member 47 for the first fit sheet collecting section 24 is located in a position (hereinafter referred to as open position) reached when it rocks counterclockwise from the holding position through an angle of approximately 90°. When the gate member 47 is in the open position, the bank notes P collected in the collecting section concerned are allowed to drop off the section.

A driving mechanism for selectively rocking the gate members 47 is not shown.

In FIG. 2, numeral 50 designates a slide cover for the money inlet slot 5. In depositing or withdrawing bank notes, a user is expected to slide the cover 5 open.

As a driving source for the several endless belts and other driving portions inside the housing 1, a motor 51 is provided in the region inside the loop formed by the second endless belt 19.

Now there will be described the operation of the automatic bank note transaction apparatus of the invention with the above-mentioned construction. First, in depositing according to the operation sequence, the user pushes a deposit key on the keyboard 3. Then, the CRT display unit 4 displays a message to the effect that the apparatus is ready to receive a passbook.

When the user inserts his passbook into the passbook inlet slot 7, the passbook is automatically introduced into the apparatus, and the information, such as the account number, recorded on the magnetic stripe on the passbook is read and checked in the apparatus. On completion of such reading and checking, the CRT display unit 4 displays a message to the effect that the apparatus is ready to receive money, and the slide cover 50 over the money inlet slot 5 slides to open the slot 5.

Thereupon, when the user puts bank notes P equivalent to his desired amount into the money inlet slot 5 and slides the cover 50 to close the slot 5, such operation is detected by a suitable detector in the apparatus. Then, the pair of introduction rollers 11 start rotation to introduce the bank notes P collected vertically in the receiving chamber 10 into the introduction-transfer path 17 one by one. The bank notes P introduced into the path 17 are judged for fitness by the discriminator 13. The bank notes P judged to be unfit are diverged from the introduction-transfer path 17 by the first distributing gate 27 to be collected in the temporary unfit sheet collecting section 23. As for the bank notes P judged to be fit, they are distributed to and collected in the temporary fit sheet collecting sections 24 to 26 by the selective operations of the second and third distributing gates 28 and 29 according to the kind of sheets.

When it is detected by a suitable detector that all the bank notes P put in the receiving chamber 10 have been taken in and transferred, the paired introduction rollers 11 cease to rotate, thereby putting an end to the bank note introduction-transfer process.

If any unfit sheets are collected in the temporary unfit sheet collecting section 23 when the aforementioned one-cycle transfer is completed, the gate member 47 rocks to the open position, and the depressing member 49 descends to push down the unfit sheets in a bundle along the guide plate 48, thus leading them into the return path 30. Then, the unfit sheets are returned through the return path 30 to the receiving chamber 10. Thereafter, the returned unfit sheets are introduced again for reprocessing for depositing by the introduction rollers 11, and judged again by the discriminator 13. The bank notes judged to be still unfit after the additional judgment are collected again in the temporary unfit sheet collecting section 23, and then returned through the return path 30 to the receiving chamber 10 in the same manner as aforesaid. When a bank note or notes judged to be unfit still remain after repeating such transfer two or three times, the CRT display unit 4 displays a message to that effect, and the slide cover 50 gets ready to be opened. Then, the user is expected to slide the cover 50 open and take out the returned unfit sheets from the receiving chamber 10.

Thus, the user need not touch the unfit sheets during the repeated transfer and discrimination or judgment till the final decision. Moreover, the bank notes P once returned as unfit sheets to the receiving chamber 10 are turned upside down and inside out when they are taken in for the reprocessing for depositing. This process will be described in detail with reference to the schematic transfer system diagram of FIG. 4.

Figure 4:
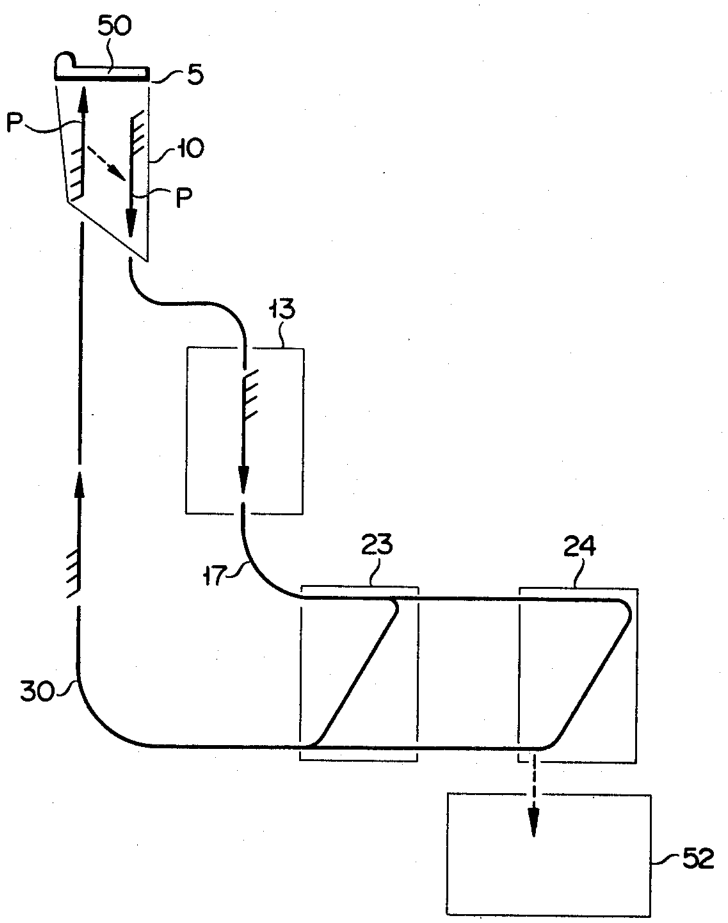
FIG. 4 is a diagram showing a transfer system for illustrating the flowing mode and direction of a bank note being transferred.

In FIG. 4, a bank note P is represented by a winged arrow for a clear understanding of the orientation of the bank note P. As may be seen from FIG. 4, the introduction-transfer path 17 and the return path 30 are connected with each other by means of the temporary unfit sheet collecting section 23 at one end portion and by means of the receiving chamber 10 at the other end portion, to form a loop. The bank note P returned through the return path 30 is vertically led into the receiving chamber 10. As may be seen from FIG. 4, the bank note P thus received in the chamber 10 is turned upside down and inside out, as compared with its initial orientation. Then, the returned bank note P moves along the inclined bottom surface of the receiving chamber 10 as indicated by the broken-line arrow while maintaining its vertical posture, and reaches the position where it is ready to be introduced again. Accordingly, the bank note P thus introduced again is judged by the discriminator 13 from an angle different from the angle for the first cycle of discrimination. If the obverse of the bank note is mainly checked in the first cycle, for example, then the reverse will mainly be checked in the second cycle. Thus, a wider region of the sheet can be checked for discrimination to improve the discriminating capability of the apparatus.

When the apparatus is cleared of the unfit sheets, the CRT display unit 4 displays the deposited amount. When the user, approving the displayed amount, pushes the approval key 3*a*, the bank notes put in by him are delivered from the temporary fit sheet collecting sections 24, 25 and 26 to their corresponding storage sections 45*a*, 45*b* and 45*c* of the cashbox 52.

If the user disapproves the displayed amount and pushes the disapproval key 3*b*, the bank notes collected in the temporary fit sheet collecting sections 24 to 26 are delivered to the return path 30, through which they are returned to the receiving chamber 10. Then, the user can slide the cover 50 open and withdraw the returned bank notes.

As is evident from FIG. 4, the fit sheets collected in the temporary fit sheet collecting section 24 can be returned through the return path 30 to the receiving chamber 10 in the same manner as the unfit sheets collected in the temporary collecting section 23. Although not shown in FIG. 4, the bank notes can be returned also from the other temporary fit sheet collecting sections 25 and 26 through the return path 30 to the receiving chamber 10.

Thus, the introduction-transfer path 17 and the return path 30 are used in common for both fit and unfit sheets with the temporary collecting sections 23 to 26 arranged horizontally, so that the length of the transfer system and the space required therefor may be reduced. This may lead to the desired compact design of the apparatus as a whole and more speedy transaction on the apparatus.

What we claim is:

1. An automatic bank note transaction apparatus provided with a housing having a money inlet slot through which bank notes for deposit are to be inserted in said apparatus, comprising:

- a bank note receiving chamber for the bank notes inserted through said money inlet slot, disposed in said housing correspondingly to said money inlet slot;
- introduction-transfer means for taking out the bank notes collected in said receiving chamber and transferring the bank notes through an introduction-transfer path;
- discriminating means disposed in said introduction-transfer path to discriminate fit sheets from unfit ones among the introduced bank notes;
- distributing means disposed in said introduction-transfer path so as to distribute the fit and unfit sheets in accordance with the result of the discrimination by said discriminating means;
- a temporary collecting section for the unfit sheets distributed by said distributing means;
- at least one storage section for the fit sheets distributed by said distributing means; and
- return transfer means for taking out the unfit sheets collected in said temporary collecting section and transferring the unfit sheets through a return path, one end portion of said return path being connected with said temporary collecting section, and the other end portion of said return path being connected with said receiving chamber so that the unfit sheets transferred through said return path may be returned to said receiving chamber.

2. An automatic bank note transaction apparatus according to claim 1, wherein said introduction-transfer path and said return transfer path are connected by means of said receiving chamber so that the unfit sheets returned to said receiving chamber may be introduced again into said apparatus by said introduction-transfer means.

3. An automatic bank notes transaction apparatus according to claim 1 or 2, further comprising at least one temporary collecting section for the fit sheets distributed by said distributing means, and switching means for selectively connecting said temporary fit sheet collecting section with said return path or said storage section corresponding thereto.

4. An automatic bank note transaction apparatus according to claim 2, wherein the unfit sheets returned to said receiving chamber can be introduced again into said apparatus as said unfit sheets are turned upside down and inside out.

5. An automatic bank note transaction apparatus according to claim 4, wherein the bank notes are collected vertically in said receiving chamber, and the unfit sheets being returned to said receiving chamber are led substantially vertically thereinto.

6. An automatic bank note transaction apparatus according to claim 3, wherein said temporary fit sheet collecting section is provided for each kind of the bank notes to be handled.

7. An automatic bank note transaction apparatus according to claim 6, wherein said temporary unfit sheet collecting section and a plurality of said temporary fit sheet collecting sections are arranged side by side along the horizontal direction.

* * * * *